(12) United States Patent
Taniguchi et al.

(10) Patent No.: US 7,496,215 B2
(45) Date of Patent: Feb. 24, 2009

(54) INFORMATION DEVICE AND COMPUTER PRODUCT

(75) Inventors: Shigeki Taniguchi, Kawasaki (JP); Mitsuhiko Yamamoto, Kawasaki (JP); Misao Kikuchi, Kawasaki (JP); Hiroshi Kage, Tokyo (JP); Akihiro Takeda, Tokyo (JP); Kenichi Tanaka, Tokyo (JP)

(73) Assignees: Fujitsu Limited, Kawasaki (JP); Mitsubishi Electric Corporation, Tokyo (JP)

( * ) Notice: Subject to any disclaimer, the term of this patent is extended or adjusted under 35 U.S.C. 154(b) by 525 days.

(21) Appl. No.: 10/862,370

(22) Filed: Jun. 8, 2004

(65) Prior Publication Data

US 2004/0233221 A1 Nov. 25, 2004

Related U.S. Application Data

(62) Division of application No. 10/346,177, filed on Jan. 17, 2003.

(30) Foreign Application Priority Data

Jan. 17, 2002 (JP) ............................. 2002-008193

(51) Int. Cl.
G06K 9/00 (2006.01)
G09G 5/00 (2006.01)
H04Q 7/20 (2006.01)

(52) U.S. Cl. ..................... 382/118; 345/619; 455/422.1
(58) Field of Classification Search ................. 382/115, 382/116, 117, 118, 155, 282, 285; 345/6, 345/419, 420, 506, 619, 663, 678; 348/267, 348/824; 455/422.1
See application file for complete search history.

(56) References Cited

U.S. PATENT DOCUMENTS

| | | | | |
|---|---|---|---|---|
| 5,517,610 A | * | 5/1996 | Takeda et al. | 705/500 |
| 5,572,656 A | | 11/1996 | Iida et al. | |
| 5,611,037 A | | 3/1997 | Hayashi | |
| 5,774,591 A | * | 6/1998 | Black et al. | 382/236 |
| 5,793,365 A | | 8/1998 | Tang et al. | |
| 5,805,981 A | | 9/1998 | Sugio et al. | |
| 5,850,463 A | | 12/1998 | Horii | |
| 5,926,575 A | * | 7/1999 | Ohzeki et al. | 382/243 |
| 6,088,040 A | | 7/2000 | Oda et al. | |
| 6,345,109 B1 | * | 2/2002 | Souma et al. | 382/118 |
| 6,433,783 B2 | | 8/2002 | Murata | |
| 6,661,906 B1 | * | 12/2003 | Kawade et al. | 382/118 |
| 6,714,660 B1 | * | 3/2004 | Ohba | 382/103 |
| 6,731,302 B1 | * | 5/2004 | Cote | 345/619 |

(Continued)

FOREIGN PATENT DOCUMENTS

DE 10003632 A1 8/2000

(Continued)

*Primary Examiner*—Abolfazl Tabatabai
(74) *Attorney, Agent, or Firm*—Staas & Halsey LLP

(57) ABSTRACT

A transmission-side cellular phone sends, via a mail server, to a reception-side cellular phone a face image and its attribute information as an attachment to an email. The reception-side cellular phone extracts the face image from the email, selects face part images from among a plurality of face part images stored in the face part storing section, combines the face image and the selected face parts, and displays the combined image. The reception-side cellular phone selects the face part images based on, for example, a number of times a telephone call from a person was not attended in a predetermined period.

9 Claims, 15 Drawing Sheets

U.S. PATENT DOCUMENTS

| | | |
|---|---|---|
| 7,039,221 B1 * | 5/2006 | Tumey et al. ............ 382/118 |
| 2001/0051535 A1 | 12/2001 | Kamimura et al |
| 2002/0005859 A1 | 1/2002 | Murata |
| 2002/0054047 A1 | 5/2002 | Toyama et al. |
| 2002/0070945 A1 | 6/2002 | Kage |
| 2002/0101446 A1 | 8/2002 | Tang et al. |
| 2003/0112259 A1 | 6/2003 | Kinjo |
| 2003/0117485 A1 | 6/2003 | Mochizuki et al. |
| 2003/0146921 A1 | 8/2003 | Taniguchi et al. |
| 2004/0095359 A1 | 5/2004 | Simon et al. |
| 2006/0145944 A1 | 7/2006 | Tarlton et al. |
| 2006/0192785 A1 | 8/2006 | Marschner et al. |

FOREIGN PATENT DOCUMENTS

| | | | |
|---|---|---|---|
| EP | 0989750 A2 | | 3/2000 |
| GB | 2362534 A | * | 11/2001 |
| GB | 2362534 A | | 11/2001 |

* cited by examiner

ORIGINAL IMAGE

EXTRACTION OF FACE PARTS

PREPARATION OF A PORTRAIT

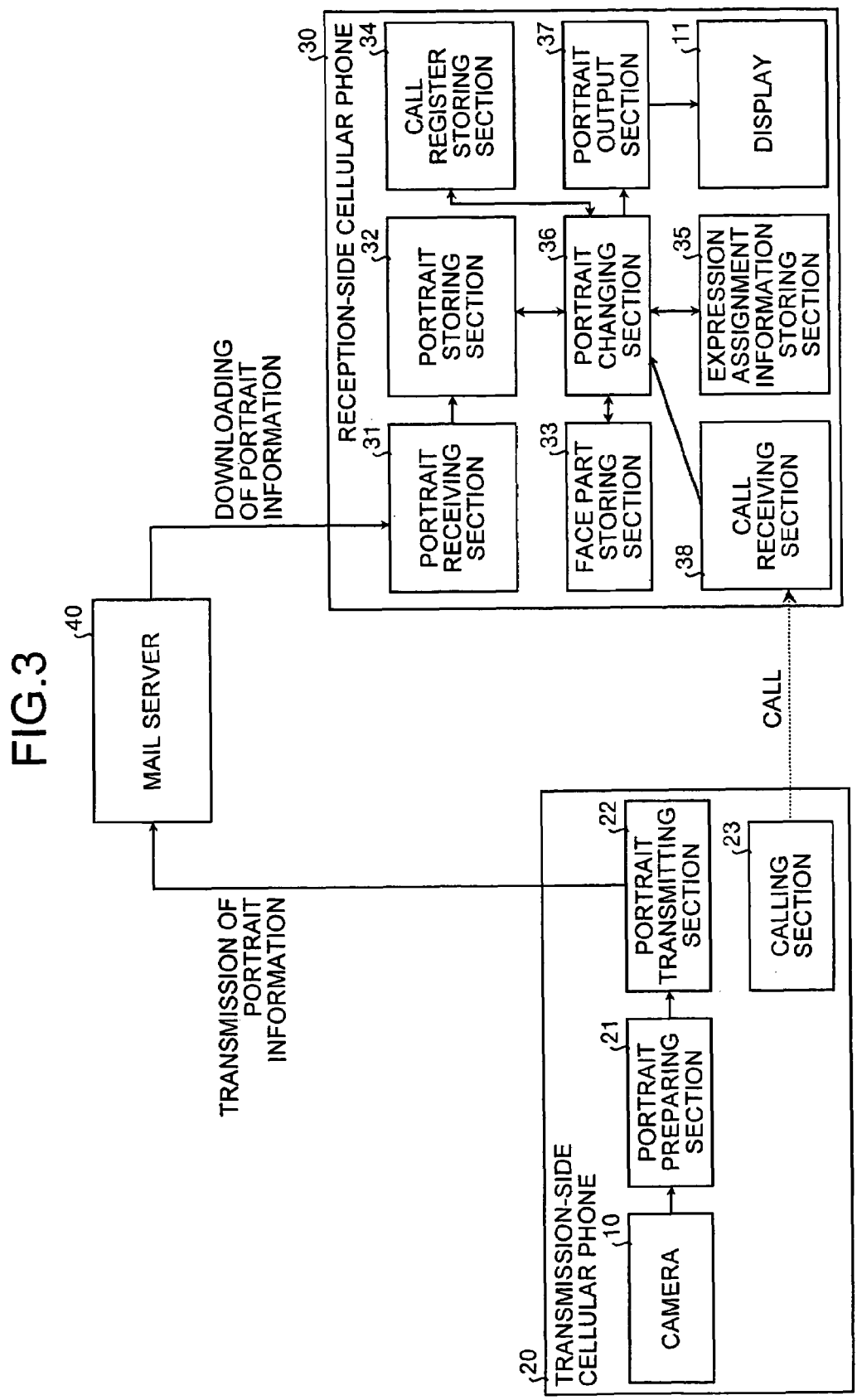

FIG.4

| TELEPHONE NUMBER | PORTRAIT | TOTAL FACE POSITION | FACE PART/POSITION | | | COLOR | |
|---|---|---|---|---|---|---|---|
| | | | EYES | MOUTH | ..... | TOTAL FACE | HAIR |
| ×××××× | ××××× | ×× | × | × | ..... | ×× | × |
| ⋮ | ⋮ | ⋮ | ⋮ | ⋮ | ⋮ | ⋮ | ⋮ |

FIG.5

| EXPRESSION ASSIGNMENT INFORMATION | FACE PART | | |
|---|---|---|---|
| | EYES | MOUTH | ..... |
| ×××××× | ×××××× | ×××××× | ..... |
| ⋮ | ⋮ | ⋮ | ⋮ |

FIG.6

| TELEPHONE NUMBER | CALL RECEPTION TIME | ABSENCE OR RESPONSE |
|---|---|---|
| ×××××× | ×××××× | ×××××× |
| ⋮ | ⋮ | ⋮ |

FIG.7

| NUMBER OF TIMES OF ABSENCE | EXPRESSION ASSIGNMENT INFORMATION |
|---|---|
| ×××××× | ×××××× |
| ⋮ | ⋮ |

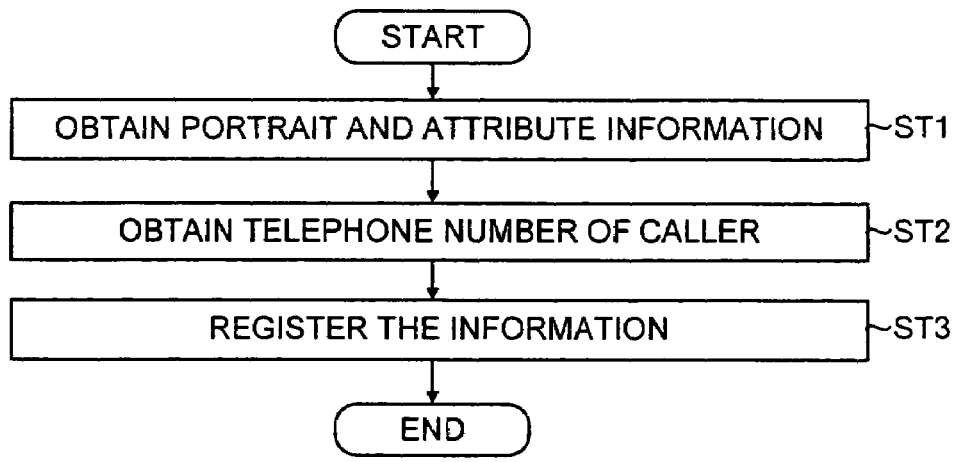
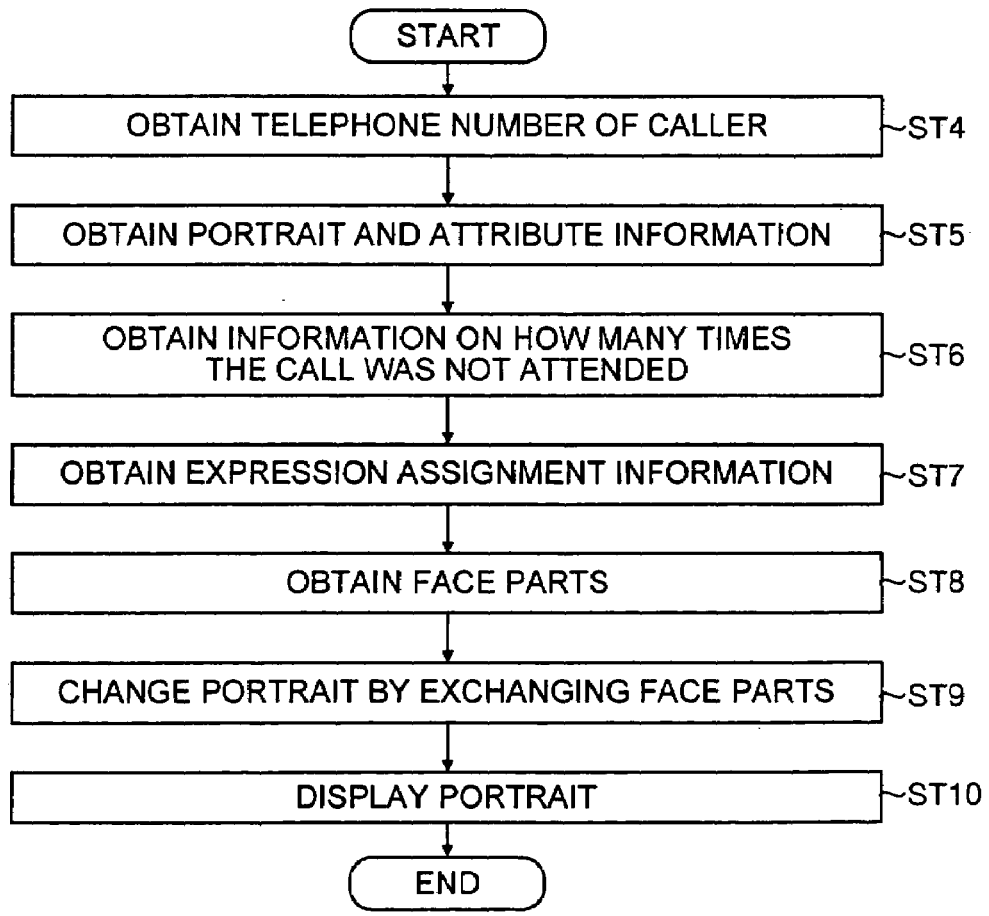

FIG.10
ORIGINAL PORTRAIT
⬇ EXPRESSIONS CHANGED
CHANGED PORTRAIT

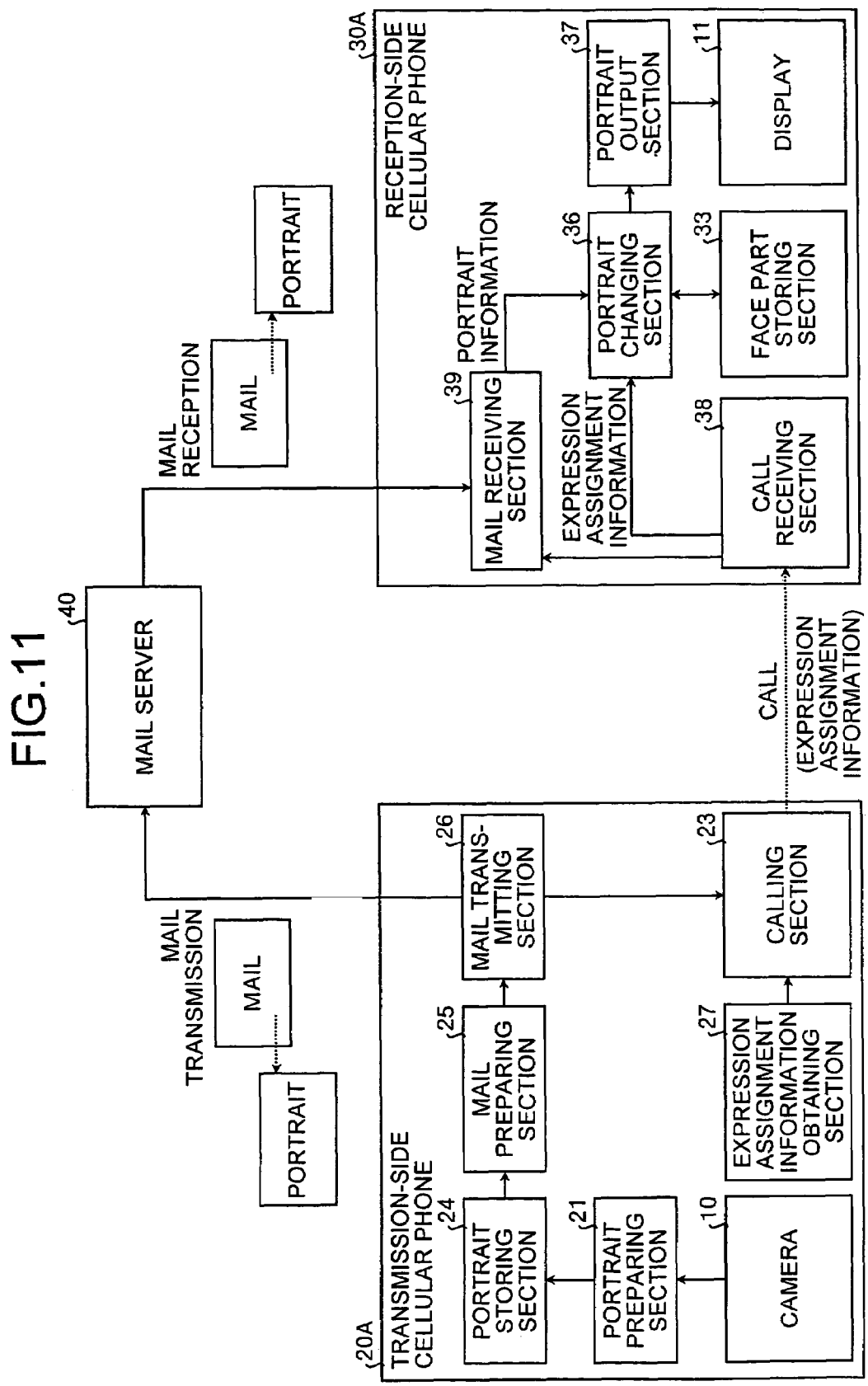

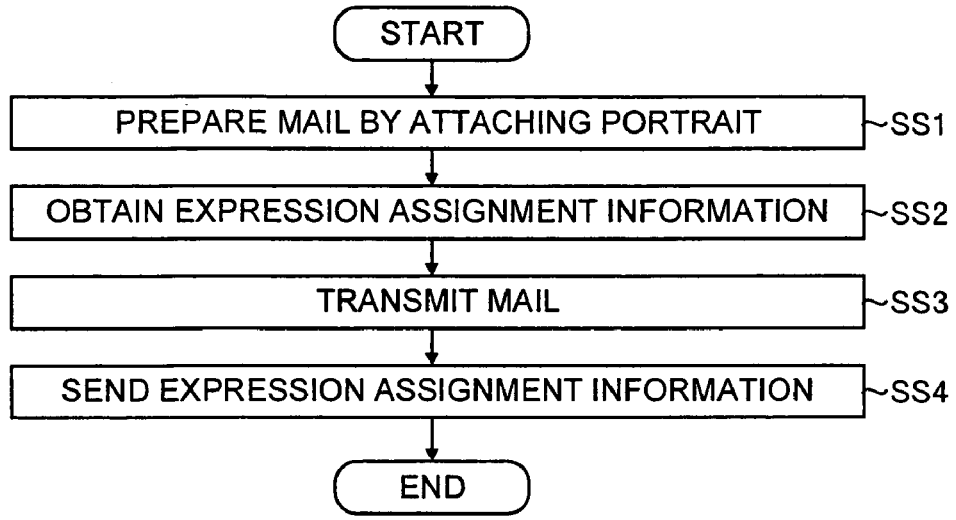
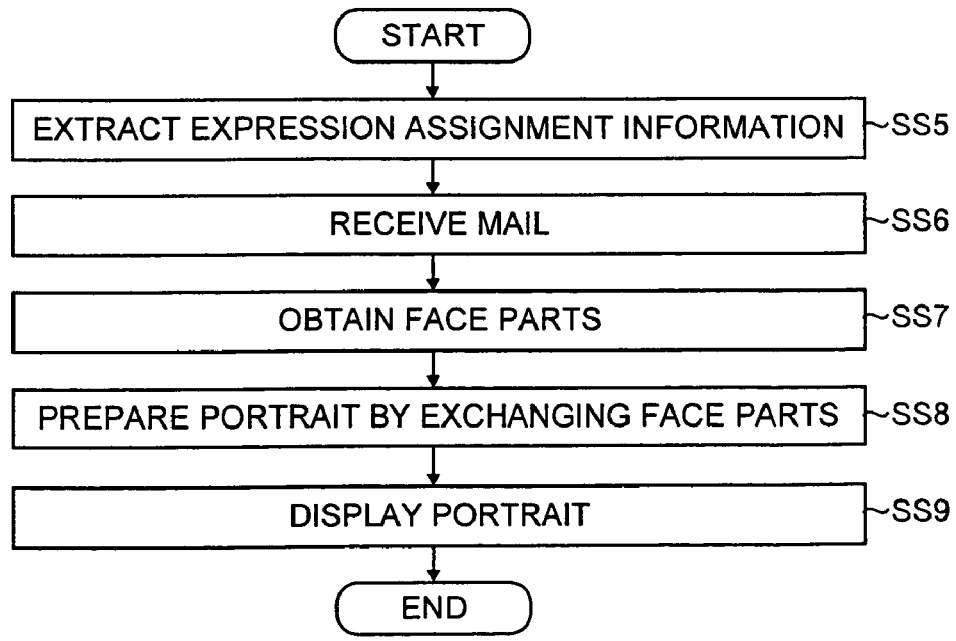

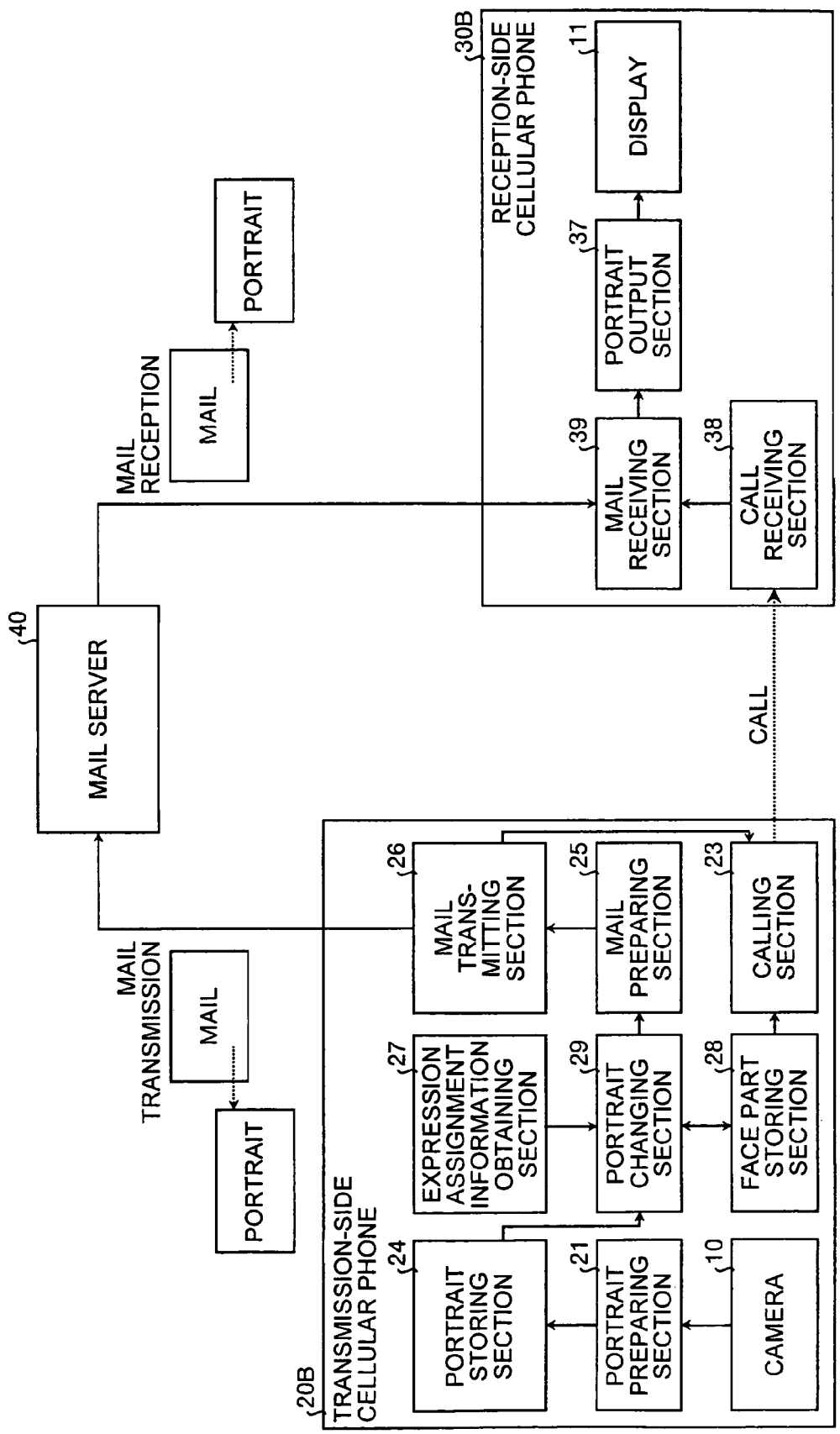

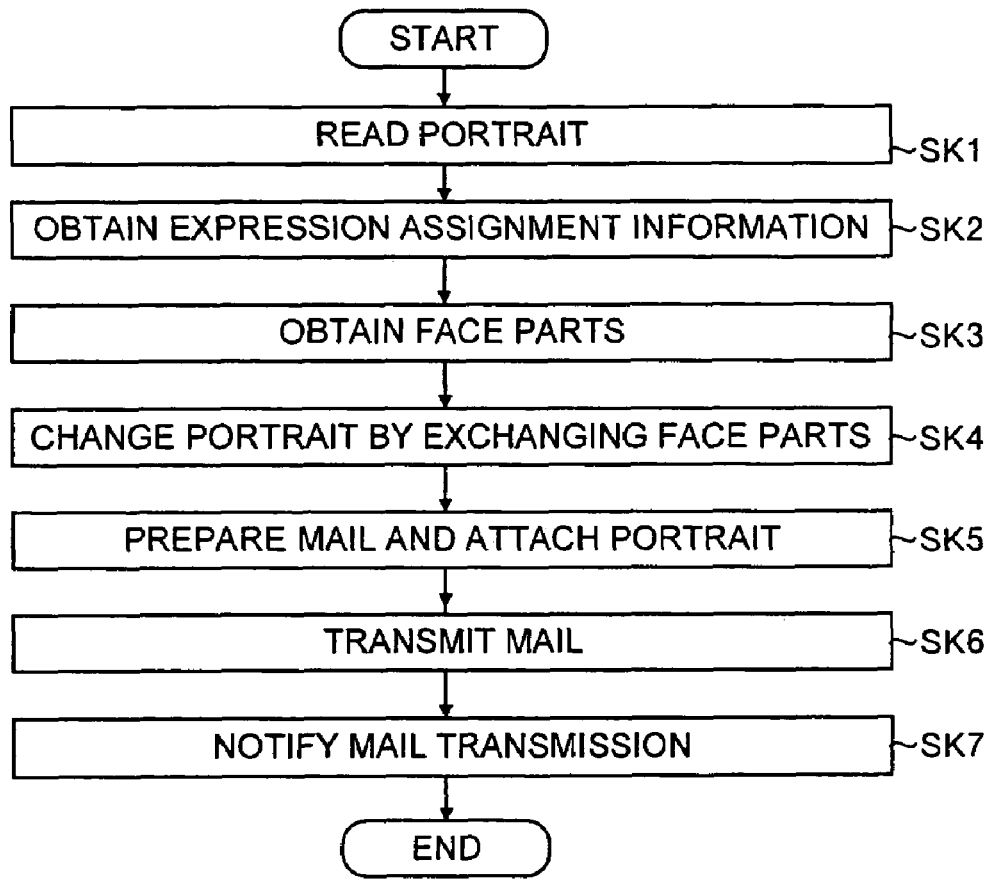

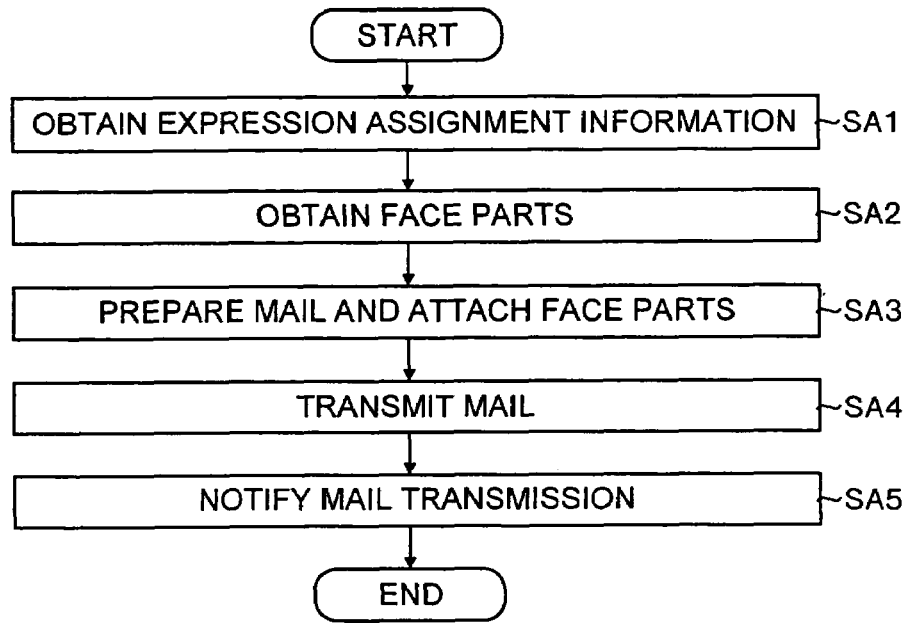
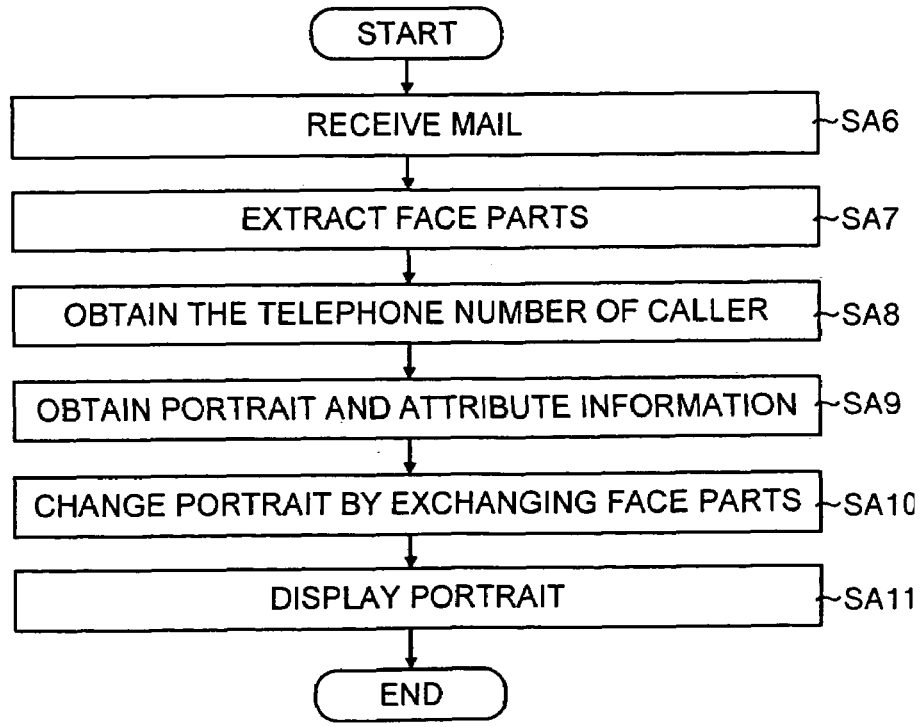

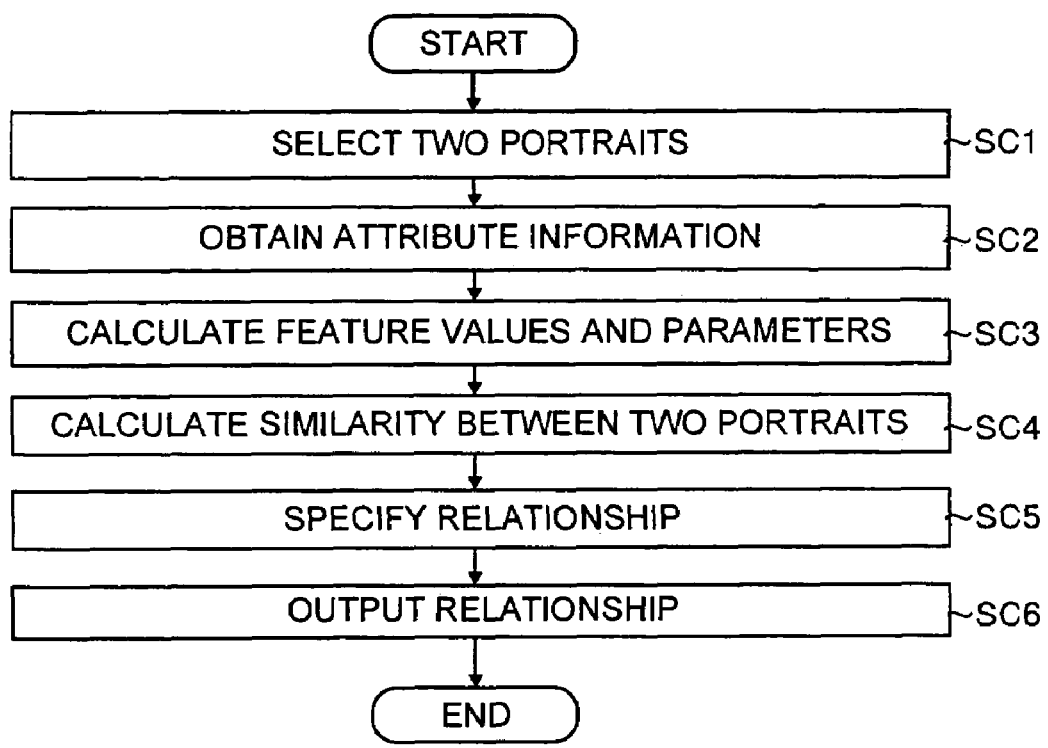

INFORMATION DEVICE AND COMPUTER PRODUCT

This application is a divisional of application Ser. No. 10/346,177, filed Jan. 17, 2003, now pending.

BACKGROUND OF THE INVENTION

1. Field of the Invention

The present invention relates to an information device such as a cellular phone having a function for combining images.

2. Description of the Related Art

Portable telephone (hereinafter "cellular phone") with built-in camera has appeared in the market. This cellular phone has a possibility of being able to realize advanced communications that the cellular phones without the built-in camera have not been able to realize. As a result, it is expected that the cellular phones with built-in camera will become more popular and widely used.

The cellular phone with a built-in camera has a function for transmitting an image, for example, a photograph of a face of a person, to another cellular phone as an attachment to an email. Some cellular phones also have a function to process the image, for example, to compresses or trim the image. The original image or the processes image may be used as an idle image (i.e., an image displayed on the idle screen).

When an image of face of one person is transmitted to the other person, it is possible to convey the face or expressions on the face of the one person to the other person, and realize better communications between the users. However, since the data quantity of the image handled by the cellular phones is high, usually about 8 KB, it exerts a great burden on the communication lines, and sometimes real-timeness of the communications is lost.

Moreover, as the data quantity of the image exerts a great burden on the mail servers, some Internet providers even tend to prohibit transmission of images among the users. As a result, the users loose the opportunity to communicate with each other using images.

Furthermore, using of an illustration or an image of a face as the idle image was know even before a cellular phone with a built-in camera appeared in the market. In other words, the advantages of the built-in camera in the cellular phone have not been fully utilized.

SUMMARY OF THE INVENTION

According to one aspect of the present invention, a face image and a plurality of face part images corresponding to facial expressions are obtained; a facial expression is determined; and the face image and the face part images corresponding to the facial expression are combined to obtain a combined face image. The combined face image may be displayed on a display or transmitter to other person.

According to another aspect of the present invention, a first face image and a second face image is obtained; a method for combining is determined; and the first face image and the second face image are combined based on the method for combining to obtain a combined face image. The combined face image may be displayed on a display or transmitter to other person.

According to still another aspect of the present invention a first face image and a second face image are obtained; a similarity between the first face image and the second face image and a relationship between the persons of the first face image and the second face image determined from the similarity are determined; and the similarity, the relationship or both the similarity and the relationship is displayed on a display.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 3 shows one example of a system for realizing communications using the cellular phone shown in FIG. 1;

FIG. 4 shows storage contents of a portrait storing section shown in FIG. 3;

FIG. 5 shows storage contents of a face part storing section shown in FIG. 3;

FIG. 6 shows storage contents of a call register storing section shown in FIG. 3;

FIG. 7 shows storage contents of an expression assignment information storing section shown in FIG. 3;

FIG. 8 shows an example of processes executed by a reception-side cellular phone shown in FIG. 3;

FIG. 9 shows another example of processes executed by the reception-side cellular phone shown in FIG. 3;

FIG. 10 explains how a portrait is prepared;

FIG. 11 shows another example of a system for realizing communications using the cellular phone shown in FIG. 1;

FIG. 12 shows an example of processes performed by a transmission-side cellular phone shown in FIG. 11;

FIG. 13 shows an example of processes performed by a reception-side cellular phone shown in FIG. 11;

FIG. 14 shows still another example of communications performed using the cellular phone shown in FIG. 1;

FIG. 15 shows an example of processes performed by a transmission-side cellular phone shown in FIG. 14;

FIG. 17 shows an example of processes performed by a transmission-side cellular phone shown in FIG. 16;

FIG. 18 shows an example of processes performed by a reception-side cellular phone shown in FIG. 16;

FIG. 21 shows an example of processes performed by a relationship estimator shown in FIG. 19.

DETAILED DESCRIPTION

Exemplary embodiments of the cellular phone according to the present invention are explained in detail below by referring to the accompanying drawings.

Figure 1:
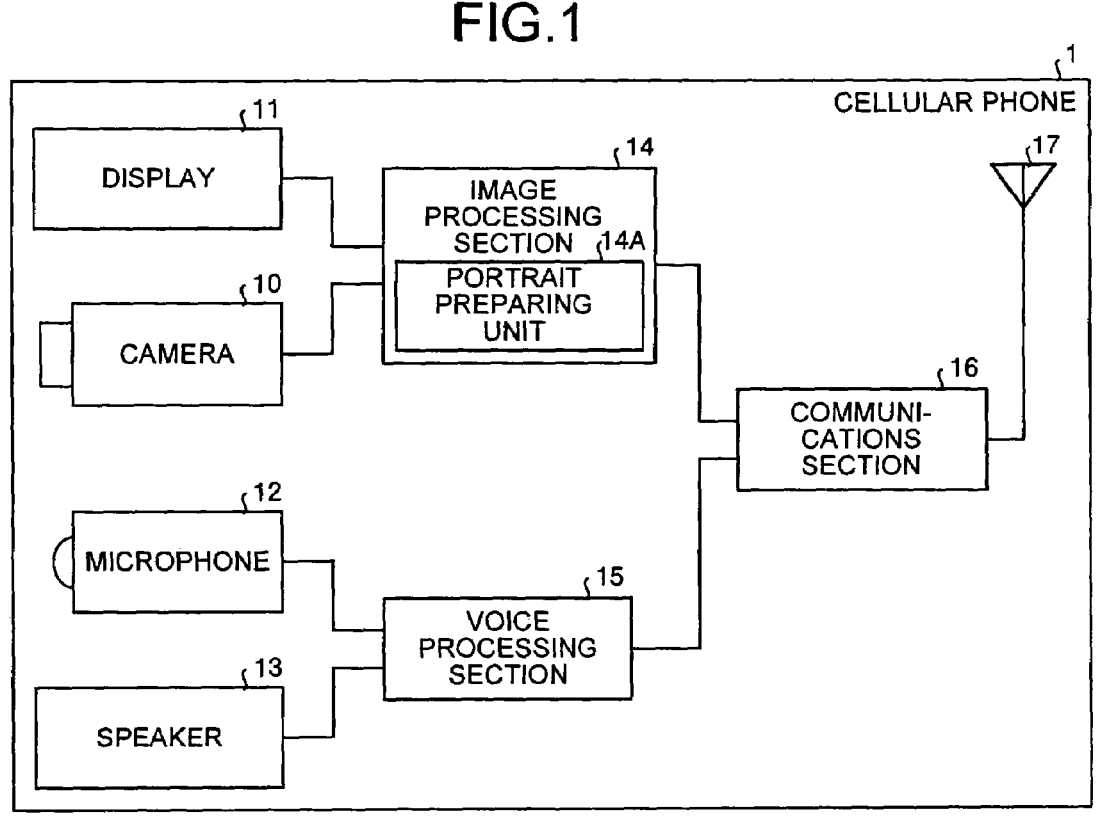
FIG. 1 shows a structure of a cellular phone according to one embodiment of the present invention.

FIG. 1 shows a structure of a cellular phone 1, as an example of an information device, according to one embodiment of the present invention. The cellular phone 1 comprises of a camera 10, a display 11, a microphone 12, a speaker 13, an image processing section 14, a voice processing unit 15, a communications section 16, and an antenna 17.

Figure 2A:
FIG. 2A to FIG. 2C explain how a portrait is prepared by the cellular phone shown in FIG. 1.
Figure 2B:
Figure 2C:

The image processing section 14 includes a portrait preparing unit 14A. This portrait preparing unit 14A receives an image (see FIG. 2A) of a face of a person (hereinafter "face image") photographed by the camera 10, converts the image into binary data, for example, and projects the data on a two dimensional coordinate system. Based on the projected data, the image processing section 14 determines: position of the overall face (hereinafter "total face), position of the eyes, the nose, the mouth, the hair, and the like (hereinafter "face parts") in the total face (see FIG. 2B), color of the total face, and color of the hair. Finally, based on this information, the image processing section 14 prepares a portrait of the face (hereinafter "portrait") (see FIG. 2C). When preparing the portrait, a standard color is used for the total face, and another standard color is used for the hair. The portrait of desired size may be prepared. It should be noted that, any method other than using the projected data may be used to prepare the portrait.

The processed face image is then transmitted to, for example, other cellular phone via the communications section 16 and the antenna 17.

Thus, in the cellular phone 1 of the present invention, the face image obtained by the camera 10 is not transmitted as it is, but the face image is processes to obtain a portrait and the portrait is transmitted. Since the portrait is used, it is possible to realize communications between the users with a simpler and slick hardware and at an extremely high speed.

FIG. 3 shows one example of a system for realizing communications using the cellular phone shown in FIG. 1. This system comprises of a transmission-side cellular phone 20 and a reception-side. cellular phone 30 connected via a mail server 40.

The transmission-side cellular phone 20 comprises of a portrait preparing section 21 that prepares a portrait and its attribute information based on the face image photographed by the camera 10, a portrait transmitting section 22 that transmits the portrait and the attribute information to the mail server 40, and a calling section 23 that makes a telephone call to the reception-side cellular phone 30. The attribute information includes the position of the total face, the positions of the face parts, the color of the total face, and the color of the hair, and the like. It is preferable that, when preparing a portrait, the portrait preparing section 21 prepares a portrait of a predetermined size.

The reception-side cellular phone 30 comprises of a portrait receiving section 31 that receives the portrait and the attribute information from the mail server 40, a portrait storing section 32 that stores the portrait and the attribute information, a face part storing section 33 that stores the face parts of the portrait prepared to change the expression of the portrait, a call register storing section 34 that stores the record of calls received (hereinafter "call reception") from the transmission-side cellular phone 20, an expression assignment information storing section 35 that stores expression assignment information that indicates to which expression the expression of the portrait is to be changed, a portrait changing section 36 that changes the portrait stored in the portrait storing section 32, a portrait output section 37 that outputs to the display 11 the changed portrait, and a call receiving section 38 that receives a call from the transmission-side cellular phone 20.

The functions of sections of the transmission-side cellular phone 20 and the reception-side cellular phone 30 may be realized by hardware or software (i.e., computer programs) or both. When the functions are realized using software, a recording medium such as a semiconductor memory may be provided to store the software.

As shown in FIG. 4, the portrait storing section 32 stores the portrait and the attribute information in correlation with the telephone number of the sender (i.e., the transmission-side cellular phone 20).

As shown in FIG. 5, the face part storing section 33 stores expressions of the face parts in correlation with condition of the expression (hereinafter "expression assignment information"). The expression assignment information is, for example, small anger, large anger, surprise, and the like.

An angry face of a person may be represented with the eyes turned upward at the outer corners, and the mouth turned down at the corners. Therefore, if the expression assignment information is anger, then a images of eyes turned upward at the outer corners, and image of mouth turned down at the corners are stored in the face part storing section 33 in correlation with the expression assignment information of "anger".

The face parts stored in the face part storing section 33 have sizes that match with the size of the portrait. The face parts with expressions may be prepared somewhere else and may be stored at the mail server 40. And, the transmission-side cellular phone 20 may be made to download the face parts.

The call register storing section 34 stores the call register information. As shown in FIG. 6, the call register information includes a telephone number of the caller, the time at which the call was received (hereinafter "call reception time"), and information that shows whether the call was attended (hereafter "absence or response").

As shown in FIG. 7, the expression assignment information storing section 35 stores number of times a call from a person was not attended (hereinafter "number of times of absence") and the expression assignment information in correlated manner.

A case is explained here in which expressions of the portrait are changed according to the number of times of absence using the flowcharts in FIG. 8 and FIG. 9. The process shown in these figures is performed by the reception-side cellular phone 30.

The transmission-side cellular phone 20 transmits a portrait and corresponding attribute information to the mail server 40 and the portrait receiving section 31 of the reception-side cellular phone 30 receives the portrait and the attribute information from the mail server 40 (step ST1). It is assumed here that the portrait is a face image of the user or owner of the transmission-side cellular phone 20. The portrait receiving section 31 of the reception-side cellular phone 30 also obtains the telephone number of the transmission-side cellular phone 20 (step ST2). Finally, the portrait, the attribute information, and the telephone number are stored in the portrait storing section 32 (step ST3).

When a call is received from the transmission-side cellular phone 20, the reception-side cellular phone 30 obtains the telephone number of the transmission-side cellular phone 20 (see step ST4 in FIG. 9). The portrait changing section 36 extracts, from the portrait storing section 32, the portrait and the attribute information relating to the telephone number obtained (step ST5). In other words, a portrait of the caller is obtained based on the telephone number.

Next, the portrait changing section 36 obtains information, from the call register storing section 34, on how many times the call from the transmission-side cellular phone 20 was not attended during a predetermined period (for example, two hours) (see step ST6). Then the portrait changing section 36 obtains expression assignment information, from the expression assignment information storing section 35, relating to the number of times the call was not attended (step ST7).

Next, the portrait changing section 36 obtains face parts with expressions relating to the expression assignment information from the face parts storing section 33 (step ST8). Then the portrait changing section 36 changes the portrait obtained via the mail server 40 by combining the face parts with expressions with the portrait (step ST9). Finally, the portrait output section 37 outputs the changed portrait to the display 11 where the portrait is displayed (step ST10).

As a result, for example, if the telephone call from a caller is second time in two hours, and the owner of the receiver has not attended the first telephone call, then a face image of the caller that is smiling is displayed on the display of the receiver. If the telephone call from a caller is third time in two hours, and the owner of the receiver has not attended the previous two telephone calls, then a face image of the caller that is little angry is displayed on the display of the receiver. If the telephone call from a caller is fourth time in two hours, and the owner of the receiver has not attended the previous three telephone calls, then, as shown in FIG. 10, a face image of the caller that is angry is displayed on the display of the receiver. Thus, the receiver will know the feelings of the caller for not attending the previous telephone calls which realizes advanced communications between the users.

FIG. 11 shows another example of a system for realizing communications using the cellular phone shown in FIG. 1. This system comprises of a transmission-side cellular phone 20A and a reception-side cellular phone 30A connected via the mail server 40.

In the system shown in FIG. 3, the reception-side cellular phone 30 decides the expression assignment information itself based on the number of calls that have not been attended. On the other hand, in the system shown in FIG. 11, the transmission-side cellular phone 20A sends the expression assignment information to the reception-side cellular phone 30A.

The transmission-side cellular phone 20A comprises of the portrait preparing section 21 that prepares a portrait and its attribute information based on the face image photographed by the camera 10, a portrait storing section 24 that stores the portrait and the attribute information, a mail preparing section 25 that prepares a mail and attaches the portrait and the attribute information to the email, a mail transmitting section 26 that transmits the email to the mail server 40, an expression assignment information obtaining section 27 that obtains the expression assignment information through interaction with the user, and the calling section 23 that sends a call signal (i.e., makes a telephone call) to the reception-side cellular phone 30A and embeds the expression assignment information into the call signal. The attribute information includes the position of the total face, the positions of the face parts, the color of the total face, and the color of the hair, and the like. It is preferable that, when preparing a portrait, the portrait preparing section 21 prepares a portrait of a predetermined size.

The reception-side cellular phone 30A comprises a mail receiving section 39 that receives a mail with a portrait attached to it from the mail server 40, the face part storing section 33 that stores the face parts of the portrait prepared to change the expression of the portrait, the portrait changing section 36 that changes expressions of the portrait attached to the mail, the portrait output section 37 that outputs the portrait to the display 11, and the call receiving section 38 that receives a call signal with the expression assignment information embedded in it from the transmission-side cellular phone 20A. The call receiving section 38 extracts the expression assignment information embedded in the call signal.

The functions of sections of the transmission-side cellular phone 20A and the reception-side cellular phone 30A may be realized by hardware or software (i.e., computer programs) or both. When the functions are realized using software, a recording medium such as a semiconductor memory may be provided to store the software. The face part storing section 33 stores the information shown in FIG. 5.

Same reference numerals have been attached to those sections in FIG. 3 and FIG. 11 that perform same or similar functions or have same or similar configurations.

The transmission-side cellular phone 20A performs the process shown in FIG. 12, while the reception-side cellular phone 30A performs the process shown in FIG. 13.

As shown in FIG. 12, the mail preparing section 25 of the transmission-side cellular phone 20A reads the portrait stored in the portrait storing section 24, prepares the email, and attaches the portrait to the email (step SS1). Generally, a portrait of the owner of the transmission-side cellular phone 20A is stored in the portrait storing section 24. Next, the expression assignment information obtaining section 27 obtains expression assignment information by interaction with the user or the owner of the transmission-side cellular phone 20A (step SS2).

Then, the mail transmitting section 26 transmits the email (with the portrait and the attribute information attached) to the mail server 40 (step SS3). The mail preparing section 25 may be made to embed the attribute information into the header of the email instead of attaching the attribute information.

Next, the calling section 23 transmits a call signal with the expression assignment information embedded to the reception-side cellular phone 30A (step SS4). The expression assignment information may be embedded into a header of the call signal. Thus, the reception-side cellular phone 30A comes to know that the transmission-side cellular phone 20A has sent a mail to it.

Thus, the portrait and attribute information are transmitted from the transmission-side cellular phone 20A to the reception-side cellular phone 30A in the form of an email. On the other hand, the expression assignment information is transmitted from the transmission-side cellular phone 20A to the reception-side cellular phone 30A through the call signal.

When a call signal is received by the call receiving section 38 of the reception-side cellular phone 30A, the call receiving section 38 extracts the expression assignment information embedded in the call signal (step SS5 in FIG. 13). The mail receiving section 39 receives a mail from the mail server 40 and sends the portrait and the attribute information attached to the email to the portrait changing section 36 (step SS6).

Then, the portrait changing section 36 obtains, from the face parts storing section 33, the face parts with expressions relating to the expression assignment information (step SS7). Then the portrait changing section 36 changes the portrait obtained via the email by combining the face parts with expressions with the portrait (step ST8). Finally, the portrait output section 37 outputs the changed portrait to the display 11 where the portrait is displayed (step SS9).

As a result, for example, if the caller is in happy mood, he can select expression assignment information that will display a face image that is smiling on the display of the cellular phone of the receiver. Thus, the receiver will know the feelings of the caller which realizes advanced communications between the users.

It has been mentioned above to embed the expression assignment information into the call signal, however, the expression assignment information may be attached to an email. Moreover, the expression assignment information may be embedded into a header of the email along with the attribute information.

FIG. 14 shows still another example of a system for realizing communications using the cellular phone shown in FIG.

1. This system comprises of a transmission-side cellular phone 20B and a reception-side cellular phone 30B connected via the mail server 40.

In the system shown in FIG. 11, the transmission-side cellular phone 20A sends the expression assignment information to the reception-side cellular phone 30A and the reception-side cellular phone 30A changes the portrait of based on the expression assignment information. On the other hand, in the system shown in FIG. 14, the transmission-side cellular phone 20B changes the portrait based on the expression assignment information and sends the changed portrait to the reception-side cellular phone 30B for displaying.

The transmission-side cellular phone 20B comprises of the portrait preparing section 21 that prepares a portrait and its attribute information based on the face image photographed by the camera 10, the portrait storing section 24 that stores the portrait and the attribute information, a face part storing section 28 that stores the face parts of the portrait prepared to change the expression of the portrait, the expression assignment information obtaining section 27 that obtains the expression assignment information through interaction with the user, a portrait changing section 29 that changes the portrait, the mail preparing section 25 that prepares an email and attaches the portrait to the email, the mail transmitting section 26 that transmits the email to the reception-side cellular phone 30B via the mail server 40, and the calling section 23 that makes a telephone call to the reception-side cellular phone 30B.

The reception-side cellular phone 30B comprises of the mail receiving section 39 that receives the email from the mail server 40, the portrait output section 37 that outputs the portrait to the display 11, and the call receiving section 38 that receives a notification from the transmission-side cellular phone 20B that an email has been send to the reception-side cellular phone 30B.

The functions of sections of the transmission-side cellular phone 20B and the reception-side cellular phone 30B may be realized by hardware or software (i.e., computer programs) or both. When the functions are realized using software, a recording medium such as a semiconductor memory may be provided to store the software. The face part storing section 28 stores the information shown in FIG. 5.

Same reference numerals have been attached to those sections in FIG. 3, FIG. 11, and FIG. 14 that perform same or similar functions or have same or similar configurations.

The transmission-side cellular phone 20B performs the process shown in FIG. 15.

The portrait changing section 29 reads the portrait stored in the portrait storing section 24 (step SK1). Generally, a portrait of the owner of the transmission-side cellular phone 20B is stored in the portrait storing section 24. Next, the expression assignment information obtaining section 27 obtains the expression assignment information by interaction with the user or the owner of the transmission-side cellular phone 20B and supplies the expression assignment information to the portrait changing section 29 (step SK2).

Then, the portrait changing section 29 obtains, from the face part storing section 28, the face parts relating to the expression assignment information (step SK3). Next, the portrait changing section 29 changes the portrait by combining the face parts (step SK4).

Next, the portrait changing section 29 supplies the portrait to the mail preparing section 25, and the mail preparing section 25 prepares an email and attaches the portrait to the email (step SK5). The mail transmitting section 26 transmits the email with the portrait attached to it to the mail server 40 (step SK6). Finally, the calling section 23 sends a call signal to the reception-side cellular phone 30B to inform the reception-side cellular phone 30B that an email has been sent (step SK7).

The mail receiving section of the reception-side cellular phone 30B receives the email with the portrait attached to it from the mail server 40, extracts the portrait from the email and supplies the portrait to the portrait output section 37. Finally, the portrait output section 37 outputs the portrait to the display 11 where the portrait is displayed.

As a result, for example, if the caller is in happy mood, he can select expression assignment information so that a face image that is smiling is sent to the receiver as a mail attachment and displayed on the display of the cellular phone of the receiver. Thus, the receiver will know the feelings of the caller which realizes advanced communications between the users.

Figure 16:
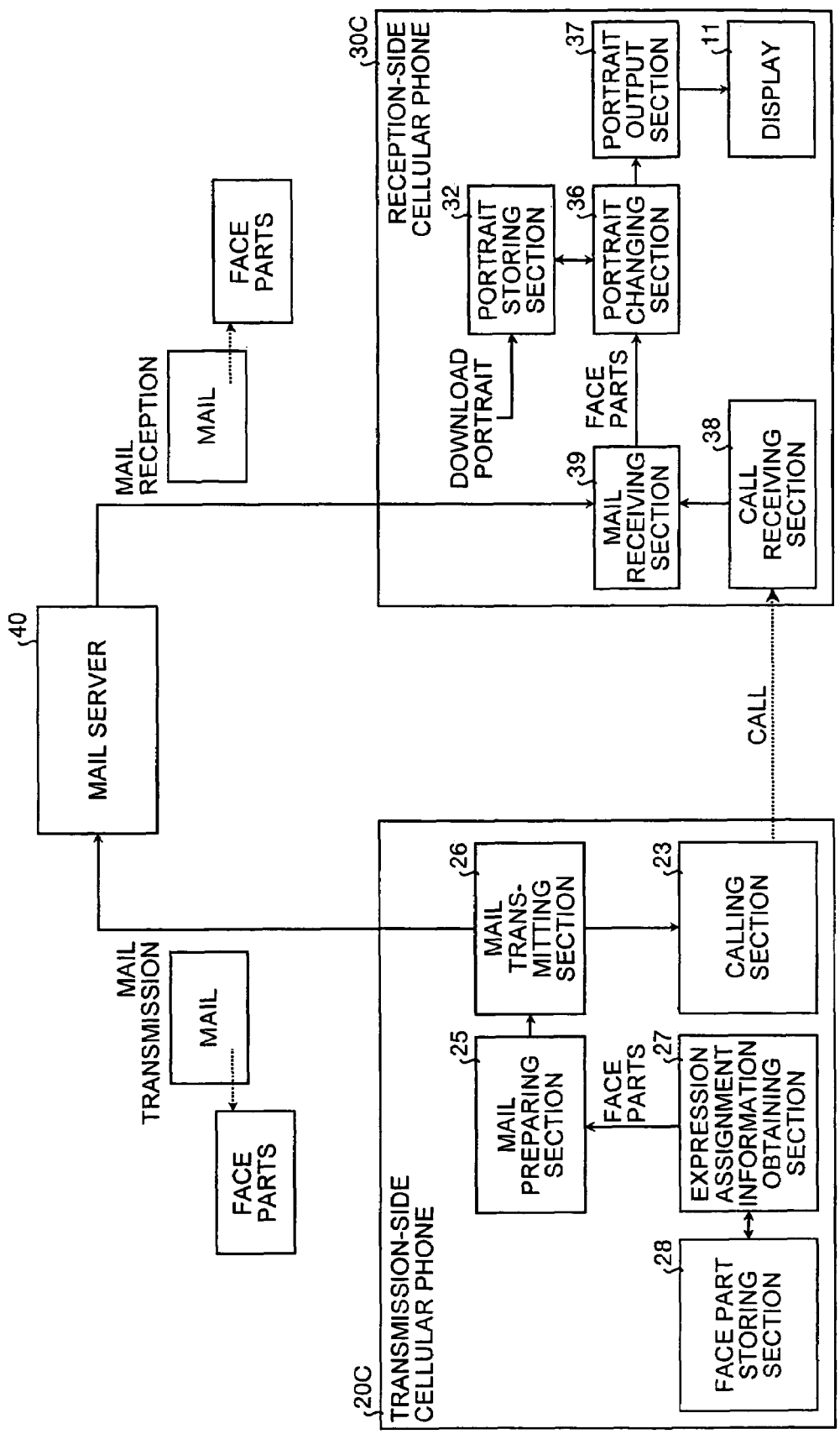
FIG. 16 shows still another example of communications performed using the cellular phone shown in FIG. 1.

FIG. 16 shows still another example of a system for realizing communications using the cellular phone shown in FIG. 1. This system comprises of a transmission-side cellular phone 20C and a reception-side cellular phone 30C connected via the mail server 40.

In the system shown in FIG. 16, the transmission-side cellular phone 20C sends face parts relating to desired expression assignment information to the reception-side cellular phone 30C via an email and the reception-side cellular phone 30C changes the portrait of based on the expression assignment information and displays the portrait.

The transmission-side cellular phone 20C comprises of the face part storing section 28 that stores the face parts of the portrait prepared to change the expression of the portrait, the expression assignment information obtaining section 27 that obtains the expression assignment information through interaction with the user, the mail preparing section 25 that prepares an email and attaches the face parts to the email, the mail transmitting section 26 that transmits the email to the reception-side cellular phone 30C via the mail server 40, and the calling section 23 that makes a telephone call to the reception-side cellular phone 30C.

The reception-side cellular phone 30C comprises of the mail receiving section 39 that receives the email from the mail server 40, the portrait storing section 32 that stores the portrait and corresponding attribute information downloaded from the transmission-side cellular phone 20C via the mail server 40, the portrait changing section 36 that changes the portrait, the portrait output section 37 that outputs the portrait to the display 11, and the call receiving section 38 that receives a notification from the transmission-side cellular phone 20C that an email has been send to the reception-side cellular phone 30C.

The functions of sections of the transmission-side cellular phone 20C and the reception-side cellular phone 30C may be realized by hardware or software (i.e., computer programs) or both. When the functions are realized using software, a recording medium such as a semiconductor memory may be provided to store the software.

The face part storing section 28 stores the information shown in FIG. 5. Moreover, the portrait storing section 32 stores the information shown in FIG. 4.

Same reference numerals have been attached to those sections in FIG. 3, FIG. 11, FIG. 14, and FIG. 16 that perform same or similar functions or have same or similar configurations.

The transmission-side cellular phone 20C performs the process shown in FIG. 17, while the reception-side cellular phone 30C performs the process shown in FIG. 18.

As shown in FIG. 17, the expression assignment information obtaining section 27 obtains expression assignment information by interaction with the user or the owner of the transmission-side cellular phone 20C (step SA1). Then, the expression assignment information obtaining section 27 obtains face parts, from the face part storing section 28, relating to the expression assignment information and supplies the face parts to the mail preparing section 25 (step SA2). The mail preparing section 25 prepares an email and attaches the face parts to the email (step SA3). Next, the mail transmitting section 26 transmits the email to the reception-side cellular phone 30C via the mail server 40 (step SA4). Finally, the calling section 23 sends a call signal to the reception-side cellular phone 30C to inform the reception-side cellular phone 30C that an email has been sent (step SA5).

The mail receiving section 39 of the reception-side cellular phone 30C receives the email with the face parts attached to it from the mail server 40 (step SA6) and extracts the face parts from the email (step SA7). Next, the portrait changing section 36 obtains the telephone number of the transmission-side cellular phone 20C (step SA8). Next, the portrait changing section 36 obtains, from the portrait storing section 32, the portrait and the attribute information relating to the telephone number of the transmission-side cellular phone 20C (step SA9).

Then, the portrait changing section 36 changes the portrait by combining the face parts with expressions with the portrait stored in the portrait storing section 32 (step SA10). Finally, the portrait output section 37 outputs the changed portrait to the display 11 where the portrait is displayed (step SA11).

As a result, for example, if the caller is in happy mood, he can select expression assignment information so that face parts that will display a face image that is smiling is sent to the receiver as a mail attachment. Thus, the receiver will know the feelings of the caller which realizes advanced communications between the users.

Figure 19:
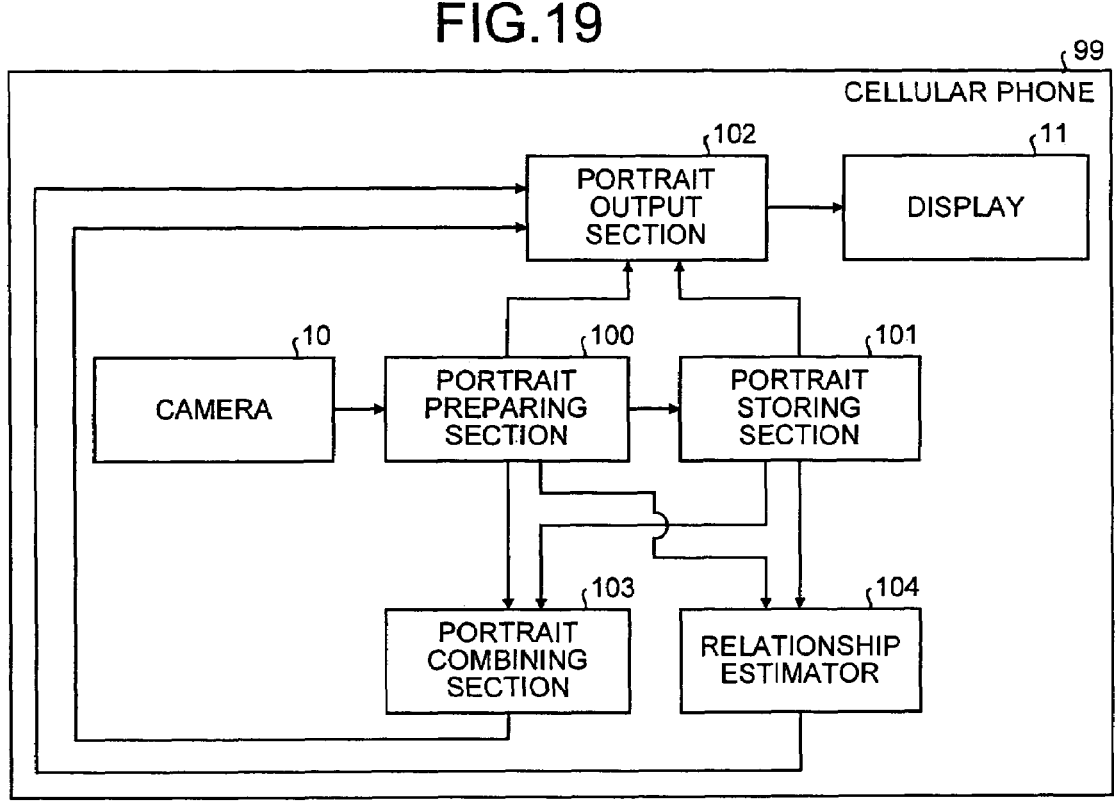
FIG. 19 shows a structure of a cellular phone according to another embodiment of the present invention.

FIG. 19 shows a structure of a cellular phone 99, as an example of an information device, according to another embodiment of the present invention.

The cellular phone 99 comprises of the camera 10, the display 11, a portrait preparing section 100 that prepares a portrait and attribute information of the portrait based on the face image photographed by the camera 10, a portrait storing section 101 that stores the portrait and the attribute information, a portrait output section 102 that outputs the portrait stored in the portrait storing section 101 or the portrait prepared by the portrait preparing section 100 (hereinafter "two portraits") to the display 11, a portrait combining section 103 that combines the two portraits, and a relationship estimator 104 that estimates the relationship between the persons of the portraits based on the two portraits.

The functions of sections of the cellular phone 99 may be realized by hardware or software (i.e., computer programs) or both. When the functions are realized using software, a recording medium such as a semiconductor memory may be provided to store the software.

Figure 20:
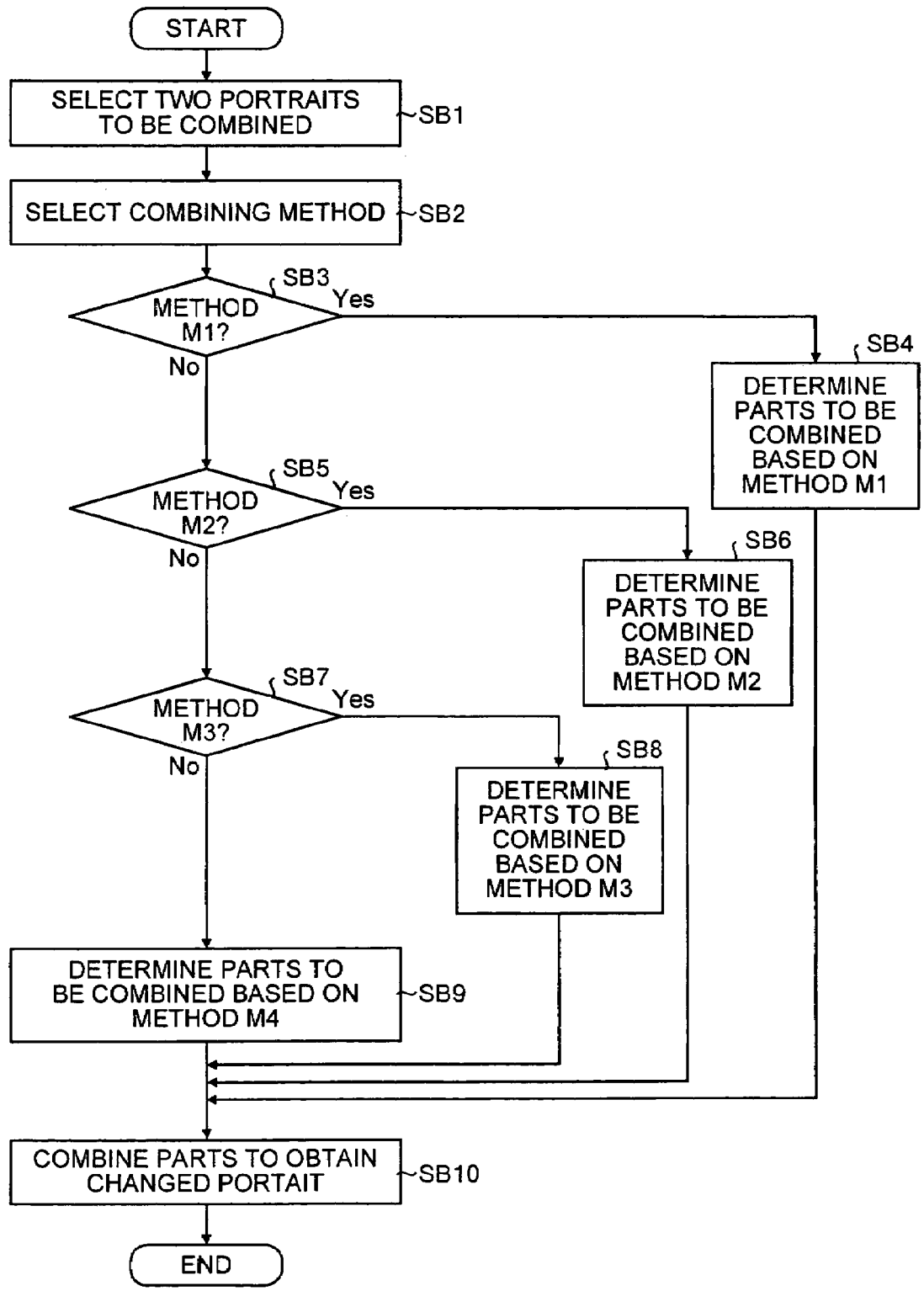
FIG. 20 shows an example of processes performed by a portrait combining section shown in FIG. 19.

FIG. 20 shows an example of processes performed by the portrait combining section 103. This process starts when the user or the owner of the cellular phone 99 issues a command to start the process.

The portrait combining section 103 first selects two portraits to be combined, through interaction with the user (step SB1). The portrait combining section 103 selects two portraits to be combined from among the portraits prepared by the portrait preparing section 100 and/or the portraits stored in the portrait storing section 101.

Next, the portrait combining section 103 selects a method for combining (hereinafter "combining method") the portraits through interaction with the user. Following methods may be considered as the methods for combining the two portraits A and B:

(1) use the eyes and the mouth of the portrait A and use the total face and other face parts of the portrait B (hereinafter "method M1"),
(2) based on random numbers determine which parts of the portrait A and B are to be used (hereinafter "method M2"),
(3) use the position information of the total face and the face parts of the portrait A, use the shapes of the total face and the face parts of the portrait B (hereinafter "method M3"),
(4) use an intermediate value of the face parts of the portrait A and B (hereinafter "method M4").

The portrait combining section 103 selects one of these combining methods through an interaction with the user. It should be noted that a combining method other than the combining methods mentioned above may be used.

Next, the portrait combining section 103 decides whether the method M1 has been selected (step SB3). If it is decided that the method M1 has been selected, the portrait combining section 103 determines from which portrait the total face is to be used and from which portrait the face parts are to be used, through interaction with the user (step SB4).

If the method M1 has not been selected at the step SB3, then it is decided whether the method M2 has been selected (step SB5). If it is decided that the method M2 has been selected, the portrait combining section 103 determines from which portrait the total face is to be used, and from which portrait each face part is to be used, by generating 1 or 2 at random (step SB6).

If the method M2 has not been selected at the step SB5, then it is decided whether the method M3 has been selected (step SB7). If it is decided that the method M3 has been selected, the portrait combining section 103 determines from which portrait the position information of the total face and the face parts is to be used, and from which portrait the shape information of the total face and the face parts is to be used, through interaction with the user (step SB8).

If the method M3 has not been selected at the step SB7, then it will mean that selected method is M4. In this case, the portrait combining section 103 calculates the intermediate value of the two shapes and the positions respectively for each of the total face and each face part, thereby to determine the total face and each face part to be pasted to form the composite portrait (step SB9).

Finally, the portrait combining section 103 combines the parts selected at step SB4 or SB6 or SB8 or SB9 to obtain a changed portrait (step SB10). The changed portrait may be displayed on the display 11 or it may be transmitted to other person.

It is mentioned above to combine parts of two portraits to obtain a changed portrait but parts of more than two portraits may be combined to obtain two or more portraits.

Thus, according to the process shown in the flowchart of FIG. 20, parts of two different portraits can be combined as desired by the user. As a result, if, for example, portraits of a man and a woman (say husband and wife) may be combined to guess a face of would be child of the two. With this arrangement, it is possible to realize advanced communications between the users.

FIG. 21 shows an example of processes performed by the relationship estimator 104. This process starts when the user or the owner of the cellular phone 99 issues a command to start the process.

The relationship estimator 104 selects two portraits through interaction with the user (step SC1). In other words, the relationship estimator 104 selects two portraits to carry out the estimation from among the portraits prepared by the portrait preparing section 100 and the portraits stored in the portrait storing section 101.

Next, the relationship estimator 104 obtains the attribute information of the portraits (i.e., the position of the total face, the positions of the face parts, the color of the total face, and the color of the hair) from the portrait preparing section 100 and the portrait storing section 101 (step SC2).

Next, the relationship estimator 104 calculates respective feature values of the portraits based on the attribute information of the portraits (where what kinds of feature values are to be used are set in advance), and calculates values of the parameters for estimating the relationship defined by difference values and ratios of the calculated feature values (step SC3).

For example, the relationship estimator 104 calculates feature values such as a distance between the two eyes, a size of a triangle formed by the two eyes and the mouth, a distance between a straight line formed by combining the two ears and a straight line formed by combining the two eyes, sizes of the eyes, a ratio of the size of the eye to the size of the ear, and the like. Then, the relationship estimator 104 calculates values of the parameters for estimating the relationship defined by the difference values and the ratios of the calculated feature values.

Next, the relationship estimator 104 substitutes the calculated parameters into the similarity calculation expression prepared in advance, thereby to calculate the similarity between the two portraits selected to estimate the relationship (step SC4).

Next, the relationship estimator 104 specifies the relationship corresponding to the calculated similarity. For example, when the relationship is within a certain range of similarity, the two persons of the portraits selected to carry out the estimation are defined such that the portraits represent the likeness between the parent(s) and the child, represent the likeness between the brothers, represent the likeness between the cousins, or represent no likeness at all. Based on this, the relationship estimator 104 specifies the relationship between the two persons corresponding to the calculated similarity.

Finally, the relationship estimator 104 makes the display 11 display the specified relationship.

According to the flowchart shown in FIG. 21, the user can determine, for example, similarity between the portraits of two persons. With this arrangement, it is possible to realize advanced communications between the users.

Instead of outputting the relationship between the two persons in the expression form of the likeness between the parent(s) and the child, it is also possible to output the calculated similarity itself.

Although a cellular phone is taken as an example of the information device, the present invention may be realized on any other information device such as a portable computer or a personal digital assistant (PDA).

As explained above, according to the portable electronic device of the present invention, it is possible to change the expression of the portrait by using the portrait having a reduced quantity of data generated based on the face image. With this arrangement, it is possible to realize advanced communications between the users.

According to the portable electronic device of the present invention, it is possible to generate, for example, the face of a child born between Mr. A and Ms. B by using the portraits having a reduced quantity of data generated based on the face images. With this arrangement, it is possible to realize advanced communications between the users.

According to the portable electronic device of the present invention, it is possible to estimate, for example, a relationship between Mr. A and Ms. B by using the portraits having a reduced quantity of data generated based on the face images. With this arrangement, it is possible to realize advanced communications between the users.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An information device comprising:
    an image obtaining unit that obtains a first face image and a second face image;
    a method determining unit that determines a method for combining from a plurality of methods; and
    an image combining unit that combines the first face image and the second face image based on the method for combining to obtain a combined face image, wherein the plurality of methods include at least one of a method of using a total face or face parts, a method of using random numbers to determine which parts of a face image are to be used, a method of using a position or a shape of a total face and face parts of a face image, and a method of using an intermediate value of face parts of a face image.

2. The information device according to claim 1, further comprising a communications unit that transmits the first face image, the second face image, or the combined face image to other information device.

3. The information device according to claim 1, further comprising
    a digital camera that acquires the first face image and the second face image, and the image obtaining unit obtains the first face image and the second face image acquired by the digital camera.

4. The information device according to claim 1, further comprising
    a memory that stores the first face image and the second face image acquired via a communications line and the image obtaining unit obtains the first face image and the second face image from the memory.

5. The information device according to claim 1, further comprising:
    a digital camera that acquires the first face image; and
    a memory that stores the second face image acquired via a communications line, and the image obtaining unit obtains the first face image from the digital camera and the second face image from the memory.

6. The information device according to claim 1, further comprising
    an operating unit with which an operator can select the first face image and the second face image from among a plurality of face images.

7. The information device according to claim 1, the method for combining is one or more selected from group consisting of
    using eyes and mouth of the first face image and using a total face and other face parts of the second face image,
    using parts of the first face image and the second face image based on generation of random numbers,
    using a position information of the total face and the face parts of the first face image, and using shapes of the total face and the face parts of the second face image, and using an intermediate value of the face parts of the first face image and the second face image.

8. The information device according to claim 1, further comprising a display unit that displays the first face image, the second face image, or the combined face image.

9. A computer-readable medium encoded with a computer program containing instruction which when executed on a computer causes the computer to perform:

acquiring a first face image and a second face image;

determining a method for combining;

combining the first face image and the second face image based on the method for combining to obtain a combined face image; and displaying the combined face image, wherein the method includes at least one of a method of using a total face or face parts, a method of using random numbers to determine which parts of a face image are to be used, a method of using a position or a shape of a total face and face parts of a face image, and a method of using an intermediate value of face parts of a face image.

* * * * *

UNITED STATES PATENT AND TRADEMARK OFFICE
CERTIFICATE OF CORRECTION

| | | |
|---|---|---|
| PATENT NO. | : 7,496,215 B2 | Page 1 of 1 |
| APPLICATION NO. | : 10/862370 | |
| DATED | : February 24, 2009 | |
| INVENTOR(S) | : Shigeki Taniguchi et al. | |

It is certified that error appears in the above-identified patent and that said Letters Patent is hereby corrected as shown below:

Column 12, Line 42, after "line" insert --,--.

Column 12, Line 59, after "from" insert --a--.

Signed and Sealed this

Nineteenth Day of May, 2009

JOHN DOLL
*Acting Director of the United States Patent and Trademark Office*